United States Patent
Kasper et al.

(10) Patent No.: US 10,915,640 B2
(45) Date of Patent: Feb. 9, 2021

(54) CYBER SECURITY TESTING FOR AUTHORIZED SERVICES

(71) Applicant: International Business Machines Corporation, Armonk, NY (US)

(72) Inventors: Michael P. Kasper, Poughkeepsie, NY (US); Bryan Childs, Poughkeepsie, NY (US); Kin Choi, Poughkeepsie, NY (US); Karl D. Schmitz, Poughkeepsie, NY (US); Kathryn Voss, New Paltz, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 302 days.

(21) Appl. No.: 16/148,092

(22) Filed: Oct. 1, 2018

(65) Prior Publication Data
US 2020/0104507 A1    Apr. 2, 2020

(51) Int. Cl.
G06F 21/57    (2013.01)

(52) U.S. Cl.
CPC ...... *G06F 21/577* (2013.01); *G06F 2221/034* (2013.01)

(58) Field of Classification Search
CPC . G06F 21/577; G06F 2221/034; G06F 21/554
(Continued)

(56) References Cited

U.S. PATENT DOCUMENTS 5,551,013 A    8/1996    Beausoleil et al.
5,574,873 A    11/1996   Davidian
(Continued)

FOREIGN PATENT DOCUMENTS

WO    2008109770 A2    9/2008

OTHER PUBLICATIONS

"Z/OS MVS Programming: Extended Addressability Guide" Retrieved from https://www.ibm.com/support/knowledgecenter/en/SSLTBW_2.1.0/com.ibm.zos.v2r1.ieaa500/ieaa500141.htm, Sep. 25, 2018, 3 pages.
(Continued)

*Primary Examiner* — Kambiz Zand
*Assistant Examiner* — Aubrey H Wyszynski
(74) *Attorney, Agent, or Firm* — Cantor Colburn LLP; Teddi Maranzano

(57) ABSTRACT

A system includes a memory system and a processing system operably coupled to the memory system. The processing system is configured to perform operations including setting a target register to point to a first protected storage location of the memory system resulting in a protection exception upon access, calling an authorized service, and confirming that the authorized service uses the target register based on detecting the protection exception. The target register is adjusted to point to a parameter list including one or more known values and a pointer to a second protected storage location resulting in the protection exception upon access to confirm use of a value of the parameter list responsive to calling the authorized service. Parameter list testing and target register testing is repeated for locations in the parameter list and target registers to construct a testing profile for vulnerability testing of the authorized service.

20 Claims, 6 Drawing Sheets

(58) Field of Classification Search
USPC .......................................................... 726/25
See application file for complete search history.

(56) References Cited

U.S. PATENT DOCUMENTS

| | | | |
|---|---|---|---|
| 5,701,408 | A | 12/1997 | Cornell et al. |
| 6,332,211 | B1 | 12/2001 | Pavela |
| 6,883,034 | B1 | 4/2005 | Pelavin et al. |
| 7,313,822 | B2 | 12/2007 | Ben-Itzhak |
| 8,490,193 | B2 | 7/2013 | Yamada et al. |
| 8,490,196 | B2 | 7/2013 | Obes et al. |
| 8,583,899 | B2 | 11/2013 | Ehrman et al. |
| 8,683,546 | B2 | 3/2014 | Dunagan et al. |
| 8,918,885 | B2 | 12/2014 | McClure et al. |
| 8,966,636 | B2 | 2/2015 | Kalman et al. |
| 9,183,397 | B2 | 11/2015 | Futoransky et al. |
| 9,183,560 | B2 * | 11/2015 | Abelow ................. G06Q 10/10 |
| 9,317,460 | B2 | 4/2016 | Greiner et al. |
| 9,715,592 | B2 | 7/2017 | Compagna et al. |
| 9,894,090 | B2 | 2/2018 | Hebert et al. |
| 2011/0035803 | A1 | 2/2011 | Obes et al. |
| 2011/0061104 | A1 | 3/2011 | Yamada et al. |
| 2014/0095556 | A1 * | 4/2014 | Lee ......................... G06F 16/13 |
| | | | 707/824 |
| 2014/0237606 | A1 | 8/2014 | Futoransky et al. |
| 2016/0381050 | A1 * | 12/2016 | Shanbhogue ....... G06F 12/1027 |
| | | | 726/23 |
| 2017/0019421 | A1 | 1/2017 | Hebert et al. |
| 2017/0271027 | A1 | 9/2017 | Childs et al. |
| 2018/0032328 | A1 | 2/2018 | Kannamparambil et al. |
| 2018/0157605 | A1 | 6/2018 | Edwards et al. |
| 2018/0365428 | A1 | 12/2018 | Edwards et al. |
| 2019/0036961 | A1 | 1/2019 | Gorodissky et al. |
| 2019/0163480 | A1 * | 5/2019 | Barrick ................. G06F 9/3863 |
| 2019/0205136 | A1 * | 7/2019 | Hu ...................... G06F 9/30076 |
| 2019/0266331 | A1 | 8/2019 | Sanchez Diaz et al. |
| 2019/0384918 | A1 | 12/2019 | Ndu et al. |
| 2020/0012600 | A1 | 1/2020 | Konoth et al. |
| 2020/0057664 | A1 | 2/2020 | Durham et al. |

OTHER PUBLICATIONS

Devanbu, et al. "Stack and queue integrity on hostile platforms," in IEEE Transactions on Software Engineering, vol. 28, No. 1, pp. 100-108, Jan. 2002, doi: 10.1109/32.979991. (Year: 2002).

C. Guo, et al., "An automated testing approach for inter-application security in Android," AST May 31-Jun. 7, 2014 Proceedings of the 9th International Workshop on Automation of Software Test, pp. 8-14.

C. Pacheco et al., "Randoop: feedback-directed random testing for Java," OOPSLA Oct. 2007 Companion to the 22nd ACM SIGPLAN Conference on Object-Oriented Programming Systems and Applications Companion, pp. 815-816.

List of IBM Patents or Patent Applications Treated as Related, Oct. 1, 2018, 2 pages.

P. Bisht, et al., "NoTamper: automatic blackbox detection of parameter tampering opportunities in web applications," CCS Oct. 2010 Proceedings of the 17th ACM Conference on Computer and Communications Security, pp. 607-618.

U.S. Appl. No. 16/148,096, filed Oct. 1, 2018, Entitled: Cyber Security for Space-Switching Program Calls, First Named Inventor: Bryan Childs.

List of IBM Patents or Patent Applications Treated as Related, Jan. 29, 2020, 2 pages.

PTES Technical Guidelines, retrieved from the Internet: http://www.pentest-standard.org/index.php/PTES_Technical_Guidelines#Creation_of_Attack_Trees, May 19, 2019, 150 pgs.

U.S. Appl. No. 16/774,059, filed Jan. 28, 2020, Entitled: Combinatorial Test Design for Optimizing Parameter List Testing, First Named Inventor: Andrew C.M. Hicks.

* cited by examiner

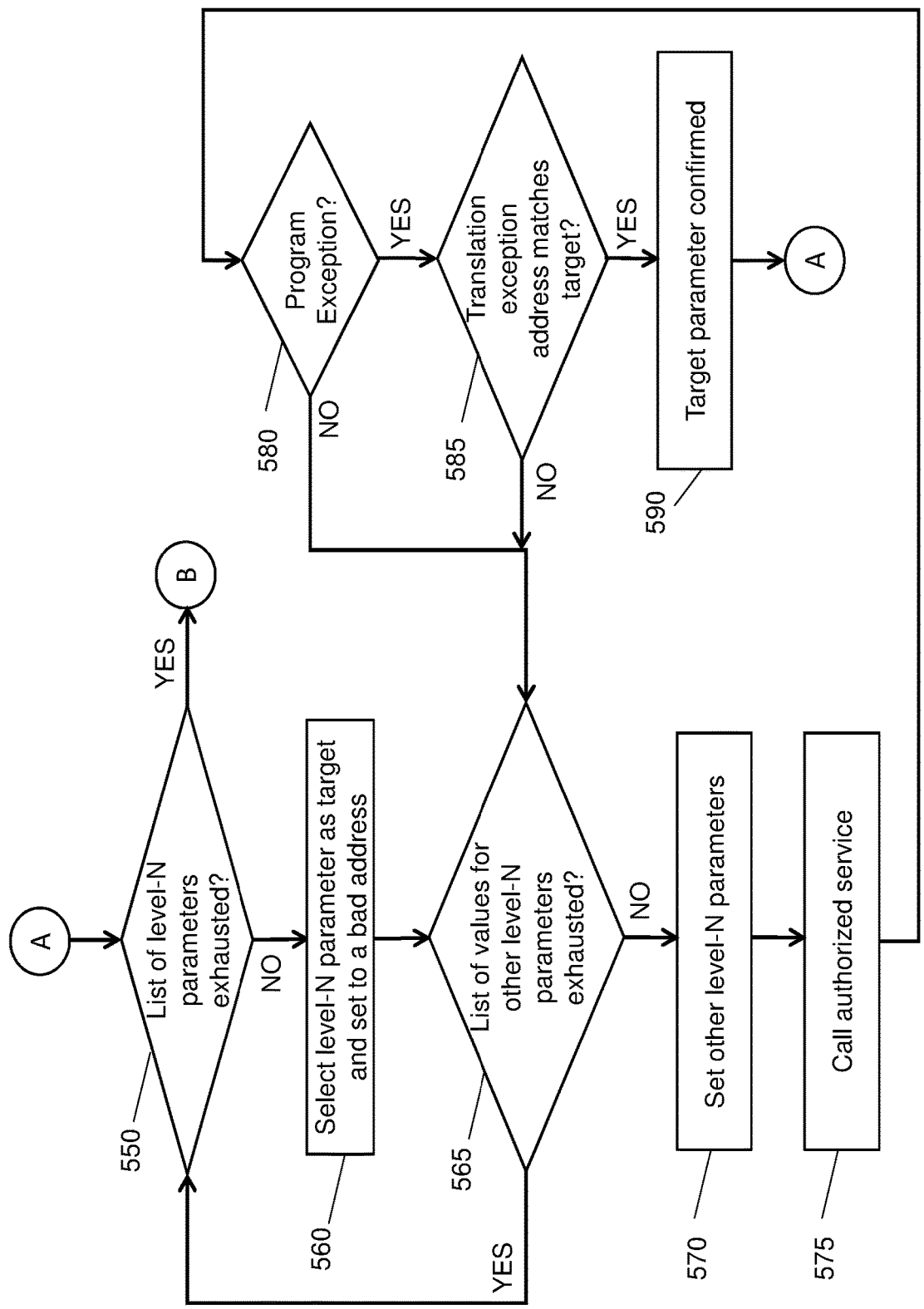

CYBER SECURITY TESTING FOR AUTHORIZED SERVICES

BACKGROUND

The present invention relates to computer systems, and more particularly, to cyber security for authorized services.

In a computer system, a kernel is a core component of an operating system that handles various tasks, such as running processes, managing devices, handling interrupts, and the like. Some tasks are performed by the kernel responsive to a system call from a process, while other tasks are performed responsive to system conditions and system management logic. The kernel has access to a memory system of a computer and can control provisioning of the memory system to user processes and operating system processes. The kernel can support virtual addressing through grouping portions of memory into pages to make larger segments or frames of memory available and appear contiguous even if the underlying physical addresses of the memory are non-contiguous.

Authorized services, also known as kernel services or programs, can allow unauthorized programs to perform authorized functions. This typically requires the authorized program to verify input from an unauthorized program in order to maintain the integrity of the computer system. However, unauthorized programs can call authorized programs in unexpected ways, potentially causing an authorized program to bypass the integrity of the computer system and violate system confidentiality, integrity, or availability.

SUMMARY

According to a non-limiting embodiment, a system includes a memory system and a processing system operably coupled to the memory system. The processing system is configured to perform operations including setting a target register to point to a first protected storage location of the memory system resulting in a protection exception upon access, calling an authorized service, and confirming that the authorized service uses the target register based on detecting the protection exception. The target register is adjusted to point to a parameter list including one or more known values and a pointer to a second protected storage location resulting in the protection exception upon access to confirm use of a value of the parameter list responsive to calling the authorized service. Parameter list testing and target register testing is repeated for locations in the parameter list and target registers to construct a testing profile for vulnerability testing of the authorized service.

According to a non-limiting embodiment, a method includes setting a target register to point to a first protected storage location of a memory system resulting in a protection exception upon access and calling an authorized service. The method further includes confirming that the authorized service uses the target register as a first address parameter based on detecting the protection exception matching the first protected storage location responsive to calling the authorized service. The method also includes adjusting the target register to point to a parameter list comprising one or more known values and a pointer to a second protected storage location of the memory system resulting in the protection exception upon access based on confirming that the authorized service uses the target register. The method further includes confirming that the authorized service uses a value of the parameter list comprising the pointer as a second address parameter based on detecting the protection exception matching the second protected storage location responsive to calling the authorized service. Parameter list testing and target register testing are repeated for a plurality of locations in the parameter list and a plurality of target registers to construct a testing profile for vulnerability testing of the authorized service.

According to a non-limiting embodiment, a computer program product includes a computer readable storage medium having program instructions embodied therewith. The program instructions are executable by a processing system to perform a plurality of operations including setting a target register to point to a first protected storage location of a memory system resulting in a protection exception upon access and calling an authorized service. The operations further include confirming that the authorized service uses the target register as a first address parameter based on detecting the protection exception matching the first protected storage location responsive to calling the authorized service. The operations also include adjusting the target register to point to a parameter list comprising one or more known values and a pointer to a second protected storage location of the memory system resulting in the protection exception upon access based on confirming that the authorized service uses the target register. The operations further include confirming that the authorized service uses a value of the parameter list comprising the pointer as a second address parameter based on detecting the protection exception matching the second protected storage location responsive to calling the authorized service. Parameter list testing and target register testing are repeated for a plurality of locations in the parameter list and a plurality of target registers to construct a testing profile for vulnerability testing of the authorized service.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5B is a flow diagram illustrating a portion of a method according to a non-limiting embodiment.

Figure 1:
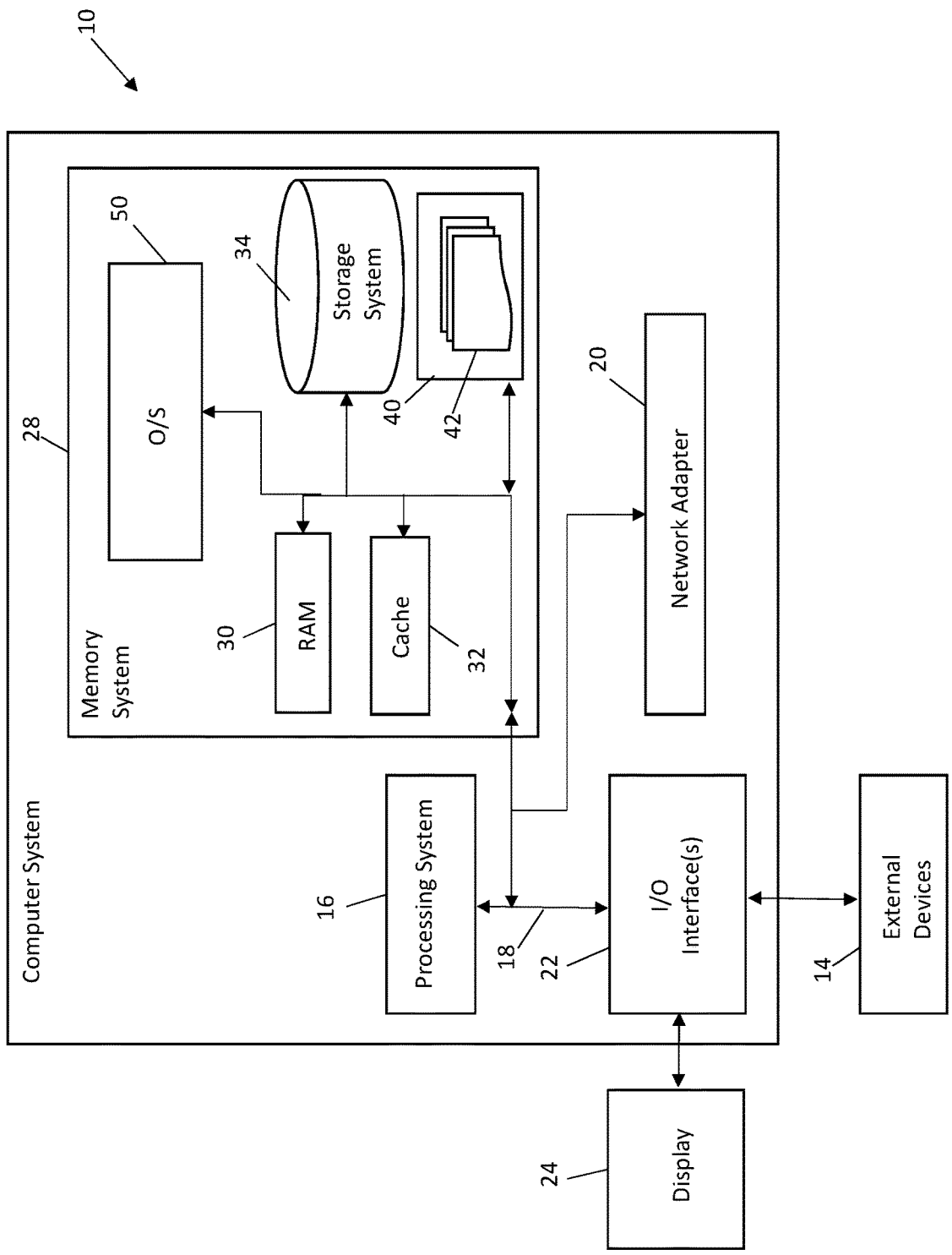
FIG. 1 is a block diagram illustrating a computer system in accordance with various embodiments of the invention.

The diagrams depicted herein are illustrative. There can be many variations to the diagrams or the operations described therein without departing from the spirit of the invention. For instance, the actions can be performed in a differing order or actions can be added, deleted or modified.

Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" can include any integer number greater than or equal to one, i.e. one, two, three, four, etc. The terms "a plurality" can include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, authorized services, also known as kernel services or authorized programs, allow unauthorized programs to perform authorized functions. Authorized services are expected to verify input from an unauthorized program in order to maintain the integrity of a computer system; however, unauthorized programs can call authorized programs in unexpected ways. Malicious unauthorized programs may not rely on documented interfaces or intended uses of a service. Further, in some cases, documentation for valid parameter lists of an authorized service may not exist.

Testing tools need to determine meaningful input data to supply to an authorized service. Random data may often return the same results every time without exercising many code paths in the authorized service, because random data does not take advantage of the structures or parts of a parameter list. A service request may often be rejected for invalid parameters before reaching many sensitive areas of an authorized code path. For example, parameter lists often contain addresses or lists of addresses. The length of an address can be determined by an addressing mode in use.

Turning now to an overview of the aspects of the invention, one or more embodiments of the invention address the above-described shortcomings of the prior art by determining which parameters of an authorized service contain addresses or other data types. Determining how an authorized service interprets parameters can enable testing programs to provide valid or invalid addresses as input in the parameters. Depth testing can be used to discover whether the authorized service uses second, third, or more level parameter lists at addresses, for instance, as pointed to by a parameter list. In order to supply complex and meaningful parameter lists with multiple levels of data and valid pointers, the form and function of the parameter list is determined, or mapped, by a cyber security test tool in embodiments.

The above-described aspects of the invention address the shortcomings of the prior art by systematically attempting to trigger exceptions when calling an authorized service. By matching an exception address to an input that was supplied, a cyber security test tool can determine, parameter-by-parameter, which parameters contain pointers to other parameter areas and which do not. Further, the cyber security test tool can determine which parameters likely do not contain pointers. The cyber security test tool may also determine which parameters likely contain numeric function codes, bit flags, or expected constants, instead of addresses. By saving this information, a map of a parameter list can be built and used in subsequent targeted testing as a testing profile. In other words, the information supplied during a failure can allow a testing program to map the parameter list and provide increasingly complex valid parameter lists to be used in increasingly complex tests.

Detecting a failing instruction address can also provide meaningful information. For instance, if altering values for a parameter causes predictable errors at different instruction addresses, the altered values could be the cause. This difference can be used to determine if a parameter contains a bit flag, or even a function code. The more information gained, the more information can be used to build complex parameters for subsequent requests to gain even more information about the parameter list and to eventually test the authorized service. Technical effects and benefits can include extending system integrity tooling to perform depth of penetration testing and help further secure a computer system. Such testing could discover ways to bypass store or fetch protection or other ways to bypass security.

With reference now to FIG. 1, a computer system 10 is illustrated in accordance with a non-limiting embodiment of the present disclosure. The computer system 10 may be based on the z/Architecture, for example, offered by International Business Machines Corporation (IBM). The architecture, however, is only one example of the computer system 10 and is not intended to suggest any limitation as to the scope of use or functionality of embodiments described herein. Regardless, computer system 10 is capable of being implemented and/or performing any of the functionality set forth hereinabove.

Computer system 10 is operational with numerous other computing system environments or configurations. Examples of well-known computing systems, environments, and/or configurations that may be suitable for use with computer system 10 include, but are not limited to, personal computer systems, server computer systems, thin clients, thick clients, cellular telephones, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Further, elements of the computer system 10 can be incorporated in one or more network devices to support computer network functionality, such as a network switch, a network router, or other such network support devices.

Computer system 10 may be described in the general context of computer system-executable instructions, such as program modules, being executed by the computer system 10. Generally, program modules may include routines, programs, objects, components, logic, data structures, and so on that perform particular tasks or implement particular abstract data types. Computer system 10 may be practiced in distributed cloud computing environments where tasks are performed by remote processing devices that are linked through a communications network. In a distributed computing environment, program modules may be located in both local and remote computer system storage media including memory storage devices.

As shown in FIG. 1, computer system 10 is shown in the form of a computing device, also referred to as a processing device. The components of computer system may include, but are not limited to, a processing system 16 including one or more processors or processing units, a memory system 28, and a bus 18 that operably couples various system components including memory system 28 to processing system 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 10 may include a variety of computer system readable media. Such media may be any available media that are accessible by computer system/server 10, and they include both volatile and non-volatile media, removable and non-removable media.

Memory system 28 can include an operating system (OS) 50, along with computer system readable media in the form of volatile memory, such as random access memory (RAM) 30 and/or cache memory 32. Computer system 10 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory system 28 may include at least one program product having a set (e.g., at least one) of program modules that are configured to carry out the functions of embodiments of the disclosure.

The OS 50 controls the execution of other computer programs and provides scheduling, input-output control, file and data management, memory management, and communication control and related services. The OS 50 can also include communication protocol support as one or more drivers to implement various protocol layers in a protocol stack (e.g., transmission control protocol/internet protocol (TCP/IP)) to support communication with other computer systems across one or more computer networks.

The storage system 34 can store a basic input output system (BIOS). The BIOS is a set of essential routines that initialize and test hardware at startup, start execution of the OS 50, and support the transfer of data among the hardware devices. When the computer system 10 is in operation, the processing system 16 is configured to execute instructions stored within the storage system 34, to communicate data to and from the memory system 28, and to generally control operations of the computer system 10 pursuant to the instructions.

Program/utility 40, having a set (at least one) of program modules 42, may be stored in memory system 28 by way of example, and not limitation, as well as the OS 50, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein at an application layer level in a communication protocol stack.

Computer system 10 may also communicate with one or more external devices 14 such as a keyboard, a pointing device, a display 24, etc.; one or more devices that enable a user to interact with computer system/server 10; and/or any devices (e.g., network card, modem, etc.) that enable computer system/server 10 to communicate with one or more other computing devices. Such communication can occur via Input/Output (I/O) interfaces 22. Still yet, computer system 10 can communicate with one or more networks such as a local area network (LAN), a general wide area network (WAN), and/or a public network (e.g., the Internet) via network adapter 20. As depicted, network adapter 20 communicates with the other components of computer system 10 via bus 18. It should be understood that although not shown, other hardware and/or software components could be used in conjunction with computer system 10. Examples include, but are not limited to: microcode, device drivers, redundant processing units, external disk drive arrays, RAID systems, tape drives, data archival storage systems, etc.

Figure 2:
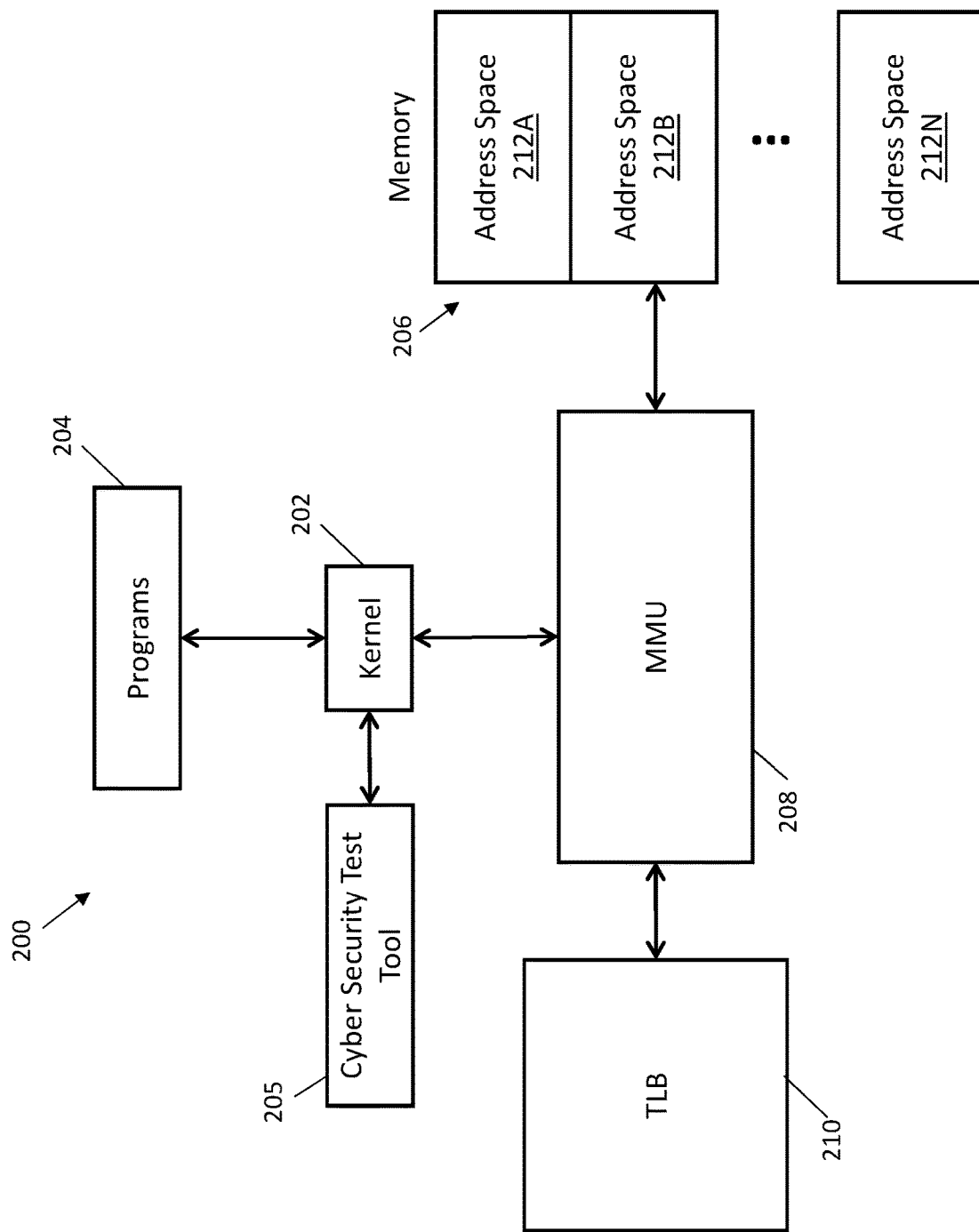
FIG. 2 is a block diagram of a memory management system according to a non-limiting embodiment.

Turning now to a more detailed description of aspects of the present invention, FIG. 2 depicts a block diagram of a memory management system 200 that can be part of the computer system 10 of FIG. 1. The memory management system 200 can include a kernel 202 of the OS 50 of FIG. 1. The kernel 202 can enable provisioning of resources of the computer system 10 of FIG. 1 to support execution of a plurality of programs 204. The kernel 202 may execute directly on the processing system 16 or as part of a virtual machine when supported by a hypervisor, for example. The kernel 202 can access memory 206 through a memory management unit 208, where the memory can be a portion of the memory system 28 of FIG. 1, such as RAM 30. The memory management unit 208 can divide the memory 206 into a plurality of pages addressed through virtual memory addressing. The memory management unit 208 can use a translation lookaside buffer 210 or other structure to support mapping of virtual page addresses to actual (e.g., physical or effective) page addresses in the memory 206. The memory 206 may be subdivided into a plurality of address spaces, such as address space 212A, address space 212B, and address space 212N that each have different access permissions. For example, some programs 204 may normally be limited to accessing the address space 212A, while the other programs 204 may normally be limited to accessing the address space 212B. Where address space switching is supported, one of the programs 204 of address space 212A may call one of the programs 204 of address space 212B, where access constraints are expected to limit permissions of the program 204 of address space 212A in address space 212B. A cyber security test tool 205 can be executed that tests for security vulnerabilities related to access constraints and other security concerns. Further details regarding the cyber security testing of the cyber security test tool 205 are described with respect to FIGS. 3 and 4.

Figure 3:
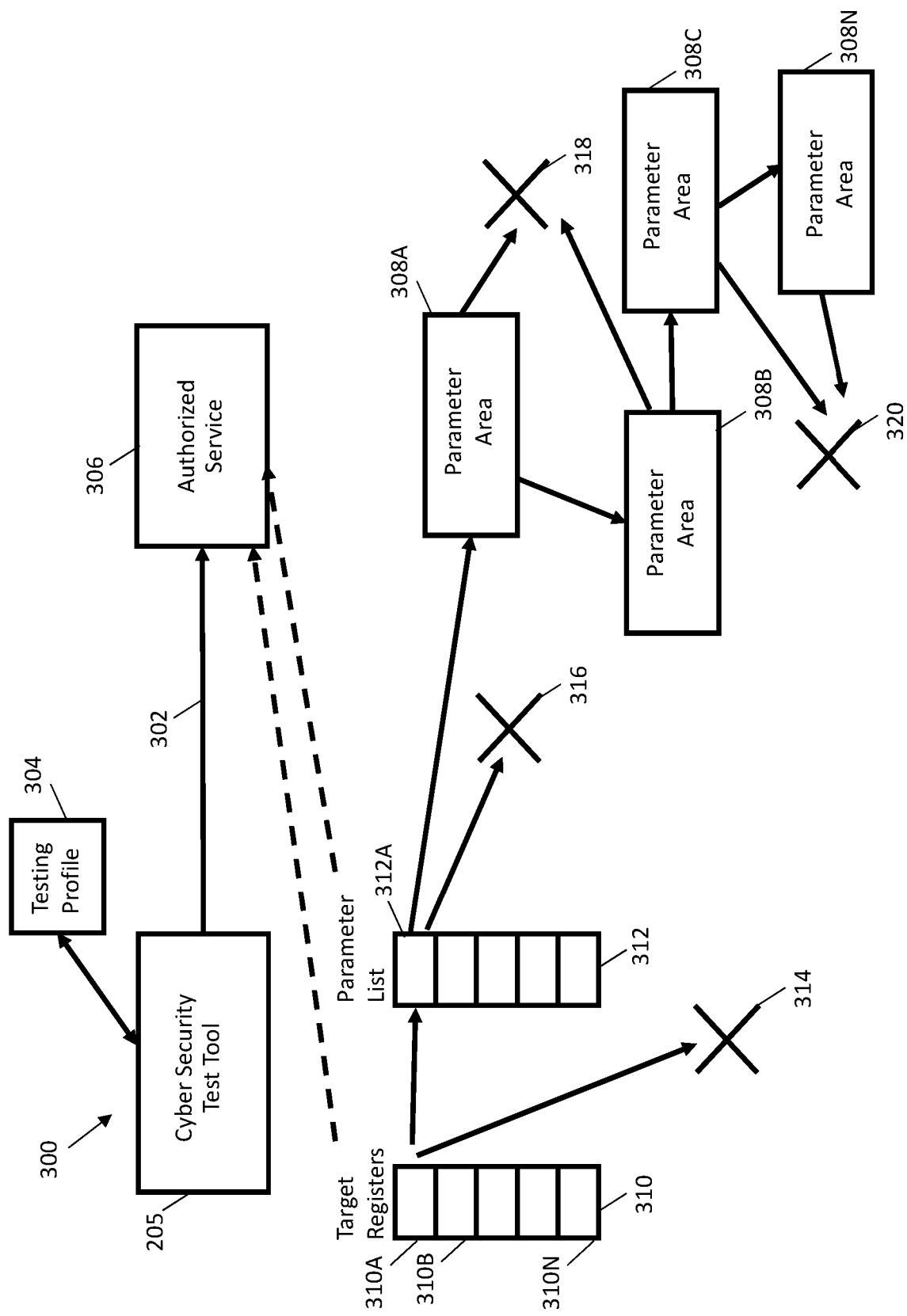
FIG. 3 is a block diagram illustrating parameter mapping through calls to an authorized service according to a non-limiting embodiment.

FIG. 3 depicts a block diagram 300 illustrating parameter mapping through a plurality of calls 302 from the cyber security test tool 205 to an authorized service 306 according to a non-limiting embodiment. The authorized service 306 may be part of the kernel 202 or programs 204 of FIG. 2 and may be able to access portions of the memory 206 of FIG. 2 that are not typically accessible by the cyber security test tool 205. The cyber security test tool 205 can act as an unauthorized caller routine to issue a service request to the authorized service 306.

The cyber security test tool 205 can determine which registers of a plurality of target registers 310 point to parameter data, such as parameter list 312. By obtaining a pointer to a first protected storage location 314 of the memory system 28 of FIG. 1 (e.g., in memory 206 of FIG. 2) that will cause a protection exception when read or overwritten, and setting a target register 310A to point to the first protected storage location 314, address effects can be isolated from other target registers 310B-310N that do not point to the first protected storage location 314. Instead, the other target registers 310B-310N can be initialized to contain expected constant values or pointers to data that does not cause a protection exception. If no protection exception occurs, the contents of the target register 310A or data at locations pointed to by the target register 310A can be modified. Further, the other target registers 310B-310N or data pointed to by the other target registers 310B-310N can be modified. If a sufficient number of possible values are exhausted but no protection exception has occurred, it is likely that the target register 310A does not contain a pointer to an address being used as a parameter by the authorized service 306. After testing every one of the target registers 310 this way, the cyber security test tool 205 can identify a list of the target registers 310 used as input to the authorized service 306.

If the cyber security test tool 205 discovers that the target register 310A (or one of the other target registers 310B-310N) holds a parameter address because a protection exception occurred for the address supplied in target register 310A, then the cyber security test tool 205 can seek to determine parameter characteristics. For example, in 64-bit addressing mode, the cyber security test tool 205 can obtain 200 bytes of storage, enough for 25 parameters of 8 bytes each. Leaving the values of the other target registers 310B-310N constant at first, or possibly varying them later, the cyber security test tool 205 can set all 25 parameters (e.g., of parameter list 312) to either contain constant values or pointers to valid storage, such as parameter areas 308A, 308B, 308C, . . . , 308N. One-by-one, the cyber security test tool 205 can set one 8-byte parameter at a time to point to a second protected storage location 316 that will cause a protection exception. When a protection exception occurs at an address after calling the authorized service 306 with the parameter list 312, the cyber security test tool 205 can confirm identification of a parameter address in the parameter list 312 pointed to by the target register 310A. Going through all of the parameter list 312, one parameter at a time, the cyber security test tool 205 can build a list or map of which parameters contain addresses. In 32, 31, or 24-bit addressing mode, 4-byte parameters could be used instead, for example.

Once a list of parameters is found that contains addresses or additional parameters, the cyber security test tool 205 can map constraints of the parameter list 312 and target registers 310 to construct a testing profile 304 of discovered relationships and extend testing of the authorized service 306 to additional level of parameters. If a first parameter 312A pointed to by target register 310A contains a pointer to a parameter area 308A, because a protection exception occurred for an address supplied as the second protected storage location 316, the cyber security test tool 205 can then try to determine characteristics of the parameter area 308A, such as whether it contains a next level parameter list. For example, the cyber security test tool 205 can obtain another 200 bytes of storage, enough for 25 parameters of 8 bytes each as the parameter area 308A. Leaving the values of the target registers 310 and the first level of parameter list 312 constant at first, possibly varying the contents later, the cyber security test tool 205 can set all 25 parameters in a second level parameter list of the parameter area 308A to contain constant values or point to valid storage, such as parameter area 308B. One-by-one, the cyber security test tool 205 can set one 8-byte parameter at a time in the parameter area 308A (e.g., the second level parameter list) to point to a protected storage location 318 that will cause a protect exception. When a protection exception occurs at an address of the protected storage location 318 after calling the authorized service 306, the cyber security test tool 205 can confirm identification of a parameter address in the parameter area 308A pointed to by the first level of parameter list 312 which is pointed to by the first target register 310A. Going through the full list with 25 parameters in the parameter area 308A, one at a time, the cyber security test tool 205 can build a list or map of which parameters contain addresses in the testing profile 304. This process can be repeated for as many levels of parameter areas as desired, such as parameter areas 308C-308N with respect to other protected storage locations 320.

In order to prevent recursion due to linked lists of parameters, the cyber security test tool 205 may take precautions. For instance, a maximum mapping depth could be established not to map past the third level of a parameter list, e.g., (stop at parameter area 308B). Since not all parameters may be addresses, other types of test data can be used as parameters, such as numeric function codes, bit strings, constants, key words, character strings, or other values. One way to determine which parameter values are effective is by trying different values for a parameter while keeping other values the same and observing the results. For example, in 32-bit addressing mode, if parameter values of '00000000'x, '00000001'x, '00000002'x, and '00000003'x all cause failures at different instruction addresses, it is likely that the parameter is a numeric function code or number. Conversely, if parameter values of '80000000'x and '00000000'x cause predictable failures at two different addresses, then it is possible the first bit in the parameter is a bit value that can be set to zero or one to request different processing. Methodically testing each of the target registers 310, then each parameter of the parameter list 312, then each level of parameter list in parameter areas 308A-308N, for addresses, function codes, bit values, or constants, a detailed map of a complex parameter list can be built in the testing profile 304 for vulnerability testing of the authorized service 306. The authorized service 306 and/or other programs 204 of FIG. 2 can be tested much more completely by using information in the testing profile 304 to supply complex valid parameters and one invalid or malicious parameter to expose security vulnerabilities such as bypassing store or fetch protection access constraints.

Figure 4:
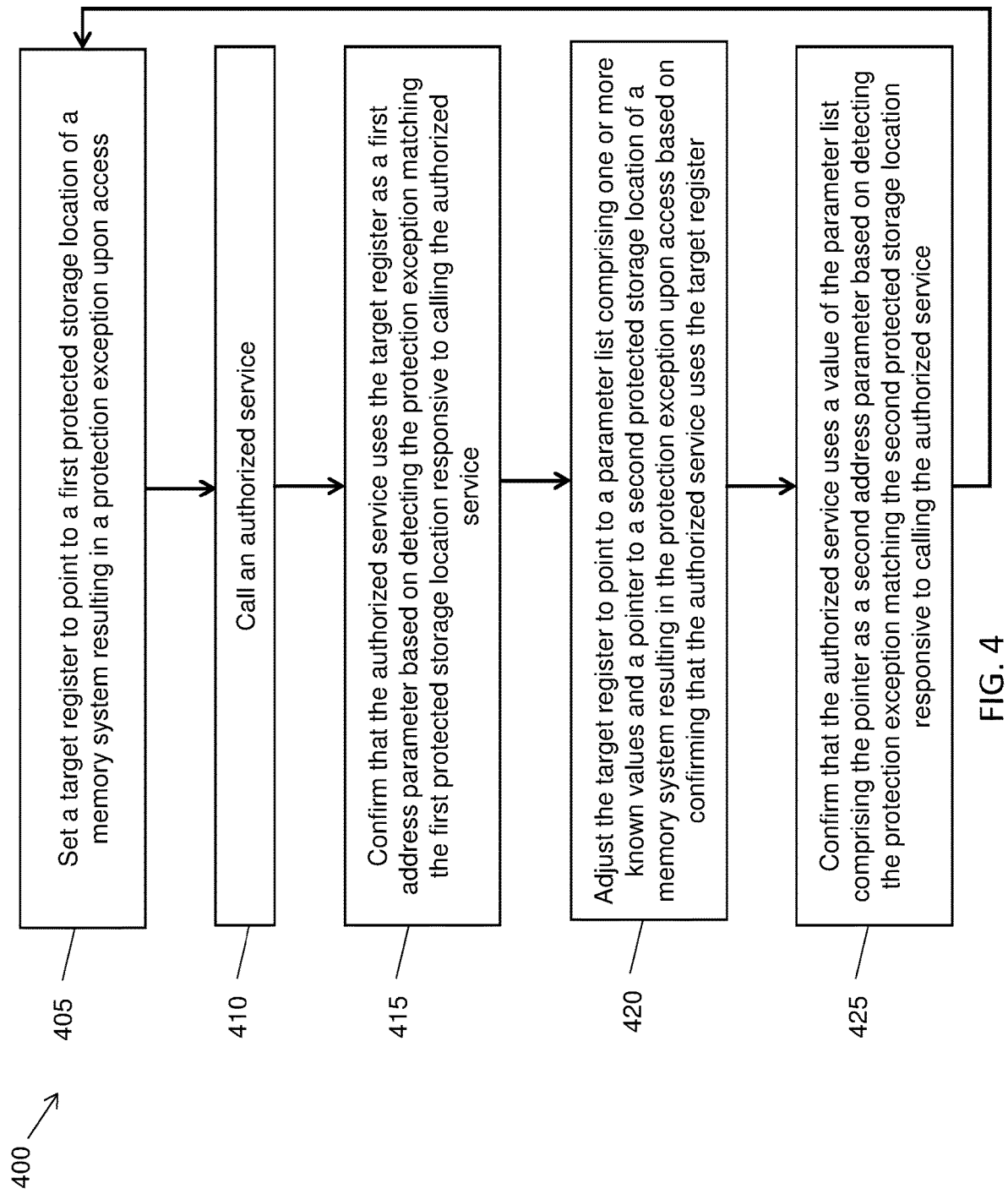
FIG. 4 is a flow diagram illustrating a method according to a non-limiting embodiment.

Turning now to FIG. 4, a flow diagram of a process 400 is generally shown in accordance with an embodiment. The process 400 is described with reference to FIGS. 1-4 and may include additional steps beyond those depicted in FIG. 4. The process 400 can be performed during a cyber security check of the computer system 10 to identify potential vulnerability issues with the authorized service 306, for instance, where direct source code analysis or interface documentation is unavailable.

At block 405, the cyber security test tool 205 sets a target register 310A to point to a first protected storage location 314 of a memory system 28 resulting in a protection exception upon access. At block 410, the cyber security test tool 205 calls 302 the authorized service 306. At block 415, the cyber security test tool 205 confirms that the authorized service 306 uses the target register 310A as a first address parameter based on detecting the protection exception matching the first protected storage location 314 responsive to calling the authorized service 306.

At block 420, the cyber security test tool 205 can adjust the target register 310A to point to a parameter list 312 including one or more known values and a pointer to a second protected storage location 316 of the memory system 28 resulting in the protection exception upon access based on confirming that the authorized service 306 uses the target register 310A. The one or more known values in the parameter list 312 can include one or more numeric function codes, one or more bit patterns, addresses of storage areas not protected from store and/or fetch access, and/or other test values, with relevant function codes and/or bit patterns determined by detecting differences in a failing instruction address when the function code or the bit pattern was changed, one increment or one bit at a time.

At block 425, the cyber security test tool 205 confirms that the authorized service 306 uses a value of the parameter list 312 including the pointer as a second address parameter based on detecting the protection exception matching the second protected storage location 316 responsive to calling the authorized service 306. The cyber security test tool 205 can repeat parameter list testing and target register testing for a plurality of locations in the parameter list 312 and a plurality of target registers 310 to construct a testing profile 304 for vulnerability testing of the authorized service 306.

As a further example, the testing can include setting one or more other target registers 310B-310N of the target registers 310 to one or more known values, such as constants, known good addresses, and the like. The cyber security test tool 205 can perform parameter list 312 depth testing progressively through a plurality of nested levels of parameter areas 308A-308N. The parameter list 312 depth testing may be limited to a maximum depth (e.g., stopping at parameter area 308C). A further example of depth testing is provided in reference to FIGS. 5A and 5B. The cyber security test tool 205 may also cycle the target register 310 through a plurality of test patterns to further develop the testing profile 304. Results can be captured to a log, database, or file and/or otherwise output, or used in real time for dynamic testing of the authorized service.

Figure 5A:
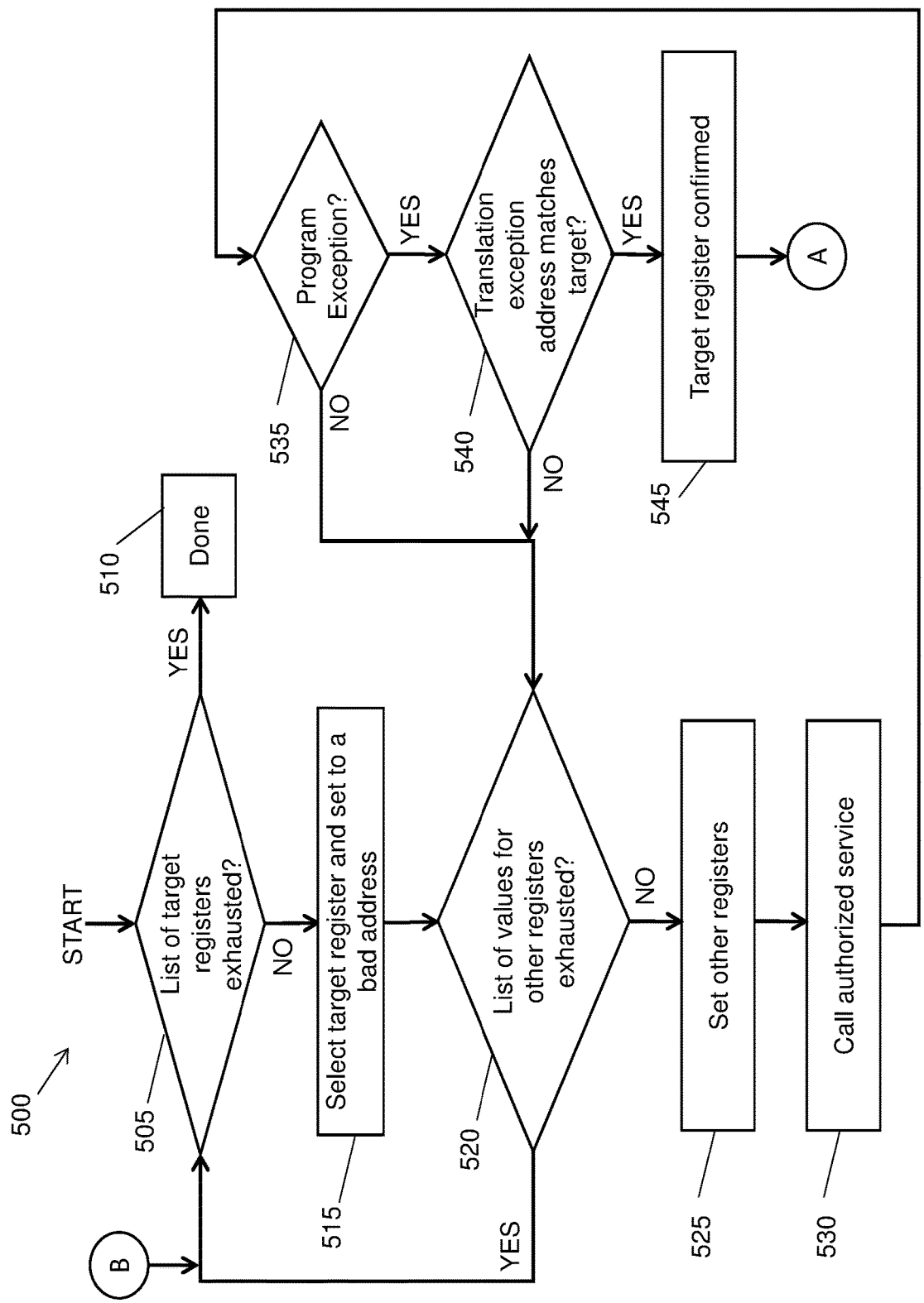
FIG. 5A is a flow diagram illustrating a portion of a method according to a non-limiting embodiment.

Turning now to FIGS. 5A and 5B, a flow diagram of a process 500 is generally shown in accordance with an embodiment. The process 500 is described with reference to FIGS. 1-5B and may include additional steps beyond those depicted in FIGS. 5A and 5B. The process 500 can be performed by the cyber security test tool 205 as a variation to the process 400 of FIG. 4.

At block 505, the cyber security test tool 205 can determine whether a list of the target registers 310 is exhausted, and if so, the process 500 is complete at block 510. If not, at block 515, the cyber security test tool 205 can select a target register 310A and set the target register 310A to a bad address, such as the first protected storage location 314. At block 520, the cyber security test tool 205 can determine whether a list of values for the other target registers 310B-310N is exhausted, and if so, return to block 505. Otherwise, the cyber security test tool 205 can set values for the other target registers 310B-310N as valid values at block 525. At block 530, the cyber security test tool 205 calls 302 the authorized service 306. At block 535, if no program exception is detected, then the process 500 returns to block 520. Otherwise, at block 540, the cyber security test tool 205 determines whether a translation exception address matches the value of the target register 310A, and if not, the process 500 returns to block 520. Otherwise, at block 545, the target register 310A is confirmed as an address reference for the authorized service 306, and the process 500 continues to block 550.

At block 550, the cyber security test tool 205 determines whether a list of level-N parameters is exhausted, such as the parameter list 312 and a maximum depth of the parameter areas 308A-308N, and if so, the process 500 returns to block 505. Otherwise, at block 560, the cyber security test tool 205 can select a parameter 312A and set the parameter 312A to a bad address, such as the second protected storage location 316. At block 565, the cyber security test tool 205 can determine whether a list of values for the other level-N parameters is exhausted (e.g., other parameters in parameter list 312), and if so, return to block 550. Otherwise, the cyber security test tool 205 can set values for the other level-N parameters as valid values at block 570. At block 575, the cyber security test tool 205 calls 302 the authorized service 306. At block 580, if no program exception is detected, then the process 500 returns to block 565. Otherwise, at block 585, the cyber security test tool 205 determines whether a translation exception address matches the target value (e.g., parameter 312A), and if not, the process 500 returns to block 565. Otherwise, at block 590, the parameter 312A is confirmed as an address reference for the authorized service 306, and the process 500 continues to block 550.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was

What is claimed is:

1. A system comprising:
a memory system; and
a processing system operably coupled to the memory system, the processing system configured to perform a plurality of operations comprising:
setting a target register to point to a first protected storage location of the memory system resulting in a protection exception upon access;
calling an authorized service;
confirming that the authorized service uses the target register as a first address parameter based on detecting the protection exception matching the first protected storage location responsive to calling the authorized service;
adjusting the target register to point to a parameter list comprising one or more known values and a pointer to a second protected storage location of the memory system resulting in the protection exception upon access based on confirming that the authorized service uses the target register;
confirming that the authorized service uses a value of the parameter list comprising the pointer as a second address parameter based on detecting the protection exception matching the second protected storage location responsive to calling the authorized service; and
repeating parameter list testing and target register testing for a plurality of locations in the parameter list and a plurality of target registers to construct a testing profile for vulnerability testing of the authorized service.

2. The system of claim 1, wherein the processing system is further configured to perform operations comprising:
setting one or more other registers of the plurality of target registers to one or more known values.

3. The system of claim 1, wherein the processing system is further configured to perform operations comprising:
performing parameter list depth testing progressively through a plurality of nested levels of parameter areas.

4. The system of claim 3, wherein the parameter list depth testing is limited to a maximum depth.

5. The system of claim 1, wherein the one or more known values in the parameter list comprise one or more valid parameter addresses.

6. The system of claim 1, wherein the one or more known values in the parameter list comprise one or more numeric function codes.

7. The system of claim 1, wherein the one or more known values in the parameter list comprise one or more bit patterns.

8. The system of claim 1, wherein the processing system is further configured to perform operations comprising:
cycling the target register through a plurality of test patterns.

9. A method comprising:
setting a target register to point to a first protected storage location of a memory system resulting in a protection exception upon access;
calling an authorized service;
confirming that the authorized service uses the target register as a first address parameter based on detecting the protection exception matching the first protected storage location responsive to calling the authorized service;
adjusting the target register to point to a parameter list comprising one or more known values and a pointer to a second protected storage location of the memory system resulting in the protection exception upon access based on confirming that the authorized service uses the target register;
confirming that the authorized service uses a value of the parameter list comprising the pointer as a second address parameter based on detecting the protection exception matching the second protected storage location responsive to calling the authorized service; and
repeating parameter list testing and target register testing for a plurality of locations in the parameter list and a plurality of target registers to construct a testing profile for vulnerability testing of the authorized service.

10. The method of claim 9, further comprising:
setting one or more other registers of the plurality of target registers to one or more known values.

11. The method of claim 9, further comprising:
performing parameter list depth testing progressively through a plurality of nested levels of parameter areas.

12. The method of claim 11, wherein the parameter list depth testing is limited to a maximum depth.

13. The method of claim 9, wherein the one or more known values in the parameter list comprise one or more valid parameter addresses.

14. The method of claim 9, wherein the one or more known values in the parameter list comprise one or more numeric function codes.

15. The method of claim 9, wherein the one or more known values in the parameter list comprise one or more bit patterns.

16. The method of claim 9, further comprising:
cycling the target register through a plurality of test patterns.

17. A computer program product comprising a computer readable storage medium having program instructions embodied therewith, the program instructions executable by a processing system to perform a plurality of operations comprising:
setting a target register to point to a first protected storage location of a memory system resulting in a protection exception upon access;
calling an authorized service;
confirming that the authorized service uses the target register as a first address parameter based on detecting the protection exception matching the first protected storage location responsive to calling the authorized service;
adjusting the target register to point to a parameter list comprising one or more known values and a pointer to a second protected storage location of the memory system resulting in the protection exception upon access based on confirming that the authorized service uses the target register;
confirming that the authorized service uses a value of the parameter list comprising the pointer as a second address parameter based on detecting the protection exception matching the second protected storage location responsive to calling the authorized service; and
repeating parameter list testing and target register testing for a plurality of locations in the parameter list and a plurality of target registers to construct a testing profile for vulnerability testing of the authorized service.

18. The computer program product of claim 17, wherein the program instructions executable by the processing system are further configured to perform operations comprising:

setting one or more other registers of the plurality of target registers to one or more known values.

19. The computer program product of claim 17, wherein the program instructions executable by the processing system are further configured to perform operations comprising:

performing parameter list depth testing progressively through a plurality of nested levels of parameter areas.

20. The computer program product of claim 17, wherein the one or more known values in the parameter list comprise: one or more valid parameter addresses, one or more numeric function codes, and/or one or more bit patterns, with relevant function codes and/or bit patterns determined by detecting differences in a failing instruction address when the function code or the bit pattern was changed, one increment or one bit at a time.

\* \* \* \* \*